US011358180B2

(12) United States Patent
Kiefer et al.

(10) Patent No.: US 11,358,180 B2
(45) Date of Patent: Jun. 14, 2022

(54) WORKPIECE COLLECTING POINT UNITS AND METHODS FOR SUPPORTING THE PROCESSING OF WORKPIECES

(71) Applicant: TRUMPF Werkzeugmaschinen GmbH + Co. KG, Ditzingen (DE)

(72) Inventors: Manuel Kiefer, Sinsheim (DE); Jens Ottnad, Karlsruhe (DE); Eberhard Wahl, Weilheim an der Teck (DE); Korbinian Weiss, Korntal (DE); Benjamin Schwarz, Muenchingen (DE); Philipp Springer, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 438 days.

(21) Appl. No.: 16/387,768

(22) Filed: Apr. 18, 2019

(65) Prior Publication Data
US 2019/0240703 A1 Aug. 8, 2019

Related U.S. Application Data

(63) Continuation of application No. PCT/EP2017/076865, filed on Oct. 20, 2017.

(30) Foreign Application Priority Data

Oct. 21, 2016 (DE) .......................... 102016120132.4

(51) Int. Cl.
*B07C 7/00* (2006.01)
*B25J 9/16* (2006.01)
(Continued)

(52) U.S. Cl.
CPC ............... *B07C 7/005* (2013.01); *B23Q 7/12* (2013.01); *B25J 9/1697* (2013.01); *B26D 5/007* (2013.01);
(Continued)

(58) Field of Classification Search
CPC . B07C 7/005; G06V 40/28; B23Q 7/12; B25J 9/1697; G05B 19/401; G05B 19/40935; G05B 19/4183
(Continued)

(56) References Cited

U.S. PATENT DOCUMENTS 5,794,789 A 8/1998 Payson et al.
9,126,423 B2 * 9/2015 Costin, Sr. ............... B41J 3/546
(Continued)

FOREIGN PATENT DOCUMENTS

CN 102056822 A 5/2011
CN 103287777 A 9/2013
(Continued)

OTHER PUBLICATIONS

JP Japanese Office Action in Japanese Appln. No. 2019-520987, dated Apr. 26, 2021, 15 pages (with English translation).
(Continued)

*Primary Examiner* — Terrell H Matthews
(74) *Attorney, Agent, or Firm* — Fish & Richardson P.C.

(57) ABSTRACT

A workpiece collecting point unit for a machine tool, in particular for a flatbed machine tool, such as a laser cutting or punching flatbed machine tool, has a placing area for workpieces produced by the machine tool within the framework of a processing plan, a display unit adapted to display information about the workpieces, which are to be further processed and were placed on the placing area, to an operator, and a signal device adapted to output an identification signal indicating to an operator the location of the selected workpiece collecting point unit for placing the workpiece, which is to be further processed, on the placing area. The workpiece collecting point unit can be used inter alia in a process to support a sequence of processing steps for processing workpieces.

14 Claims, 5 Drawing Sheets

(51) Int. Cl.
  *G05B 19/418* (2006.01)
  *G06V 40/20* (2022.01)
  *B23Q 7/12* (2006.01)
  *B26D 5/00* (2006.01)
  *G05B 19/401* (2006.01)
  *G05B 19/4093* (2006.01)

(52) U.S. Cl.
  CPC ..... *G05B 19/401* (2013.01); *G05B 19/40935* (2013.01); *G05B 19/4183* (2013.01); *G06V 40/28* (2022.01); *G05B 2219/31304* (2013.01); *G05B 2219/31372* (2013.01); *G05B 2219/32014* (2013.01); *G05B 2219/32037* (2013.01); *G05B 2219/36167* (2013.01); *G05B 2219/45047* (2013.01); *Y02P 90/02* (2015.11)

(58) Field of Classification Search
  USPC ........................................................ 209/549
  See application file for complete search history.

(56) References Cited

U.S. PATENT DOCUMENTS

| | | | |
|---|---|---|---|
| 10,040,631 B2 | 8/2018 | Shakes et al. | |
| 11,059,076 B2 * | 7/2021 | Bauer | G05B 19/40935 |
| 2006/0104479 A1 | 5/2006 | Bonch-Osmolovskiy et al. | |
| 2007/0135962 A1 | 6/2007 | Kawabe et al. | |
| 2010/0121480 A1 | 5/2010 | Stelzer et al. | |
| 2010/0272961 A1* | 10/2010 | Costin, Jr. | B23K 26/355 428/156 |
| 2011/0035045 A1 | 2/2011 | Walter | |
| 2011/0155706 A1* | 6/2011 | Nagatomo | B23K 26/53 219/121.72 |
| 2013/0226643 A1 | 8/2013 | Sakaue et al. | |
| 2013/0249943 A1 | 9/2013 | Chen et al. | |
| 2013/0312371 A1 | 11/2013 | Ambrose | |
| 2014/0305917 A1* | 10/2014 | Gadd | B23K 26/36 219/121.72 |
| 2015/0081090 A1 | 3/2015 | Dong | |
| 2015/0264858 A1 | 9/2015 | Chan et al. | |
| 2016/0062345 A1 | 3/2016 | Stubbs et al. | |
| 2016/0107468 A1* | 4/2016 | Leynadier | B41J 11/0085 347/16 |
| 2016/0154395 A1 | 6/2016 | Llanos et al. | |
| 2017/0341172 A1* | 11/2017 | Oonishi | B23H 11/003 |

FOREIGN PATENT DOCUMENTS

| | | | | |
|---|---|---|---|---|
| CN | 103793712 A | 5/2014 | | |
| CN | 104528244 A | 4/2015 | | |
| DE | 102008018436 | 10/2009 | | |
| DE | 102011054360 | 4/2013 | | |
| DE | 102014211353 | 12/2015 | | |
| DE | 102016104663 | 9/2017 | | |
| DE | 102017120381 A1 * | 3/2019 | ........... | G01S 1/0428 |
| EP | 0928641 | 7/1999 | | |
| EP | 1524063 | 4/2005 | | |
| EP | 1487616 | 6/2010 | | |
| EP | 2161219 | 11/2011 | | |
| EP | 2161219 B1 * | 11/2011 | ............. | B65G 1/137 |
| JP | 2007-164379 | 2/1997 | | |
| JP | H10-236614 | 9/1998 | | |
| JP | 2004-258855 | 9/2004 | | |
| JP | 2005-309545 | 11/2005 | | |
| JP | 2008-532888 | 8/2008 | | |
| JP | 2009-075941 | 4/2009 | | |
| JP | 2009-129056 | 6/2009 | | |
| JP | 2010-102495 | 5/2010 | | |
| JP | 2011-073876 A | 4/2011 | | |
| JP | 2012-243045 | 12/2012 | | |
| JP | 2013243273 | 12/2013 | | |
| JP | 2014088234 A | 5/2014 | | |
| JP | 2016-052919 | 4/2016 | | |
| JP | 2016-075969 | 5/2016 | | |
| JP | 2012-218037 | 11/2021 | | |
| WO | WO 2014/028959 | 2/2014 | | |
| WO | WO-2018073418 A1 * | 4/2018 | ............. | B07C 7/005 |

OTHER PUBLICATIONS

U.S. Office Action in U.S. Appl. No. 16/387,745, dated Nov. 19, 2020, 10 pages.
JP Japanese Office Action in Japanese Appln. No. 2019-520985, dated Aug. 10, 2021, 12 pages (with English translation).
JP Japanese Office Action in Japanese Appln. No. 2019-520986, dated Aug. 31, 2021, 17 pages (with English translation).
JP Japanese Office Action in Japanese Appln. No. 2019-521088, dated Mar. 16, 2021, 6 pages (with English translation).
DE Office Action in German Appln. No. 102016120132.4, dated Jan. 22, 2018, 17 pages (with English translation).
DE Office Action in German Appln. No. 102016120131.6, dated Apr. 30, 2019, 13 pages (with English translation).
PCT International Search Report and Written Opinion in International Appln. No. PCT/EP2017/076867, dated Feb. 21, 2018, 19 pages.
PCT International Search Report in International Appln. No. PCT/EP2018/072863, dated Jan. 2, 2019, 9 pages (with English translation).
PCT International Preliminary Report on Patentability in International Appln. No. PCT/EP2017/076867, dated Apr. 23, 2019, 14 pages.
CN Office Action in Chinese Appln. No. 201780064973.3. dated Sep. 24, 2020, 16 pages (with English translation).

* cited by examiner

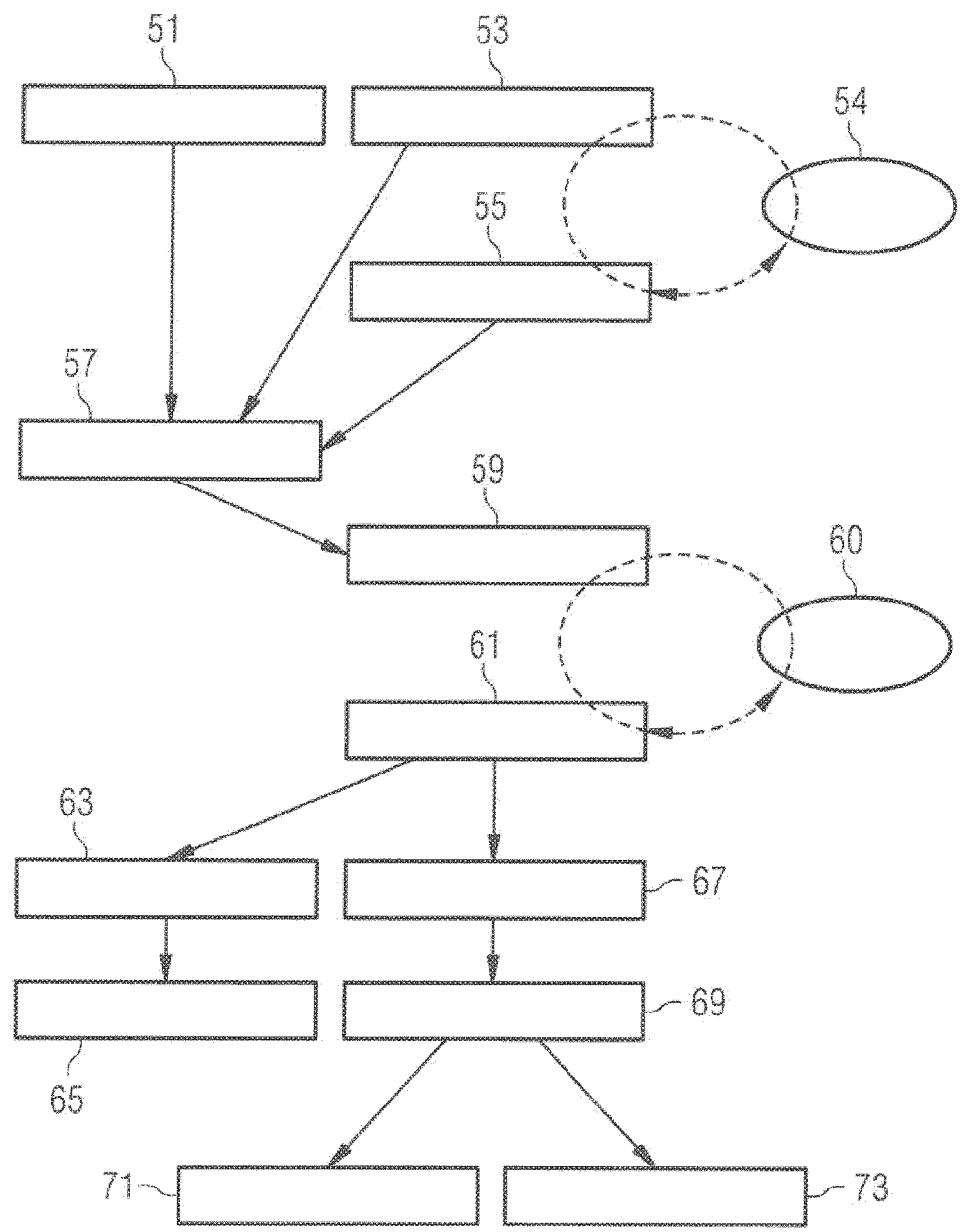

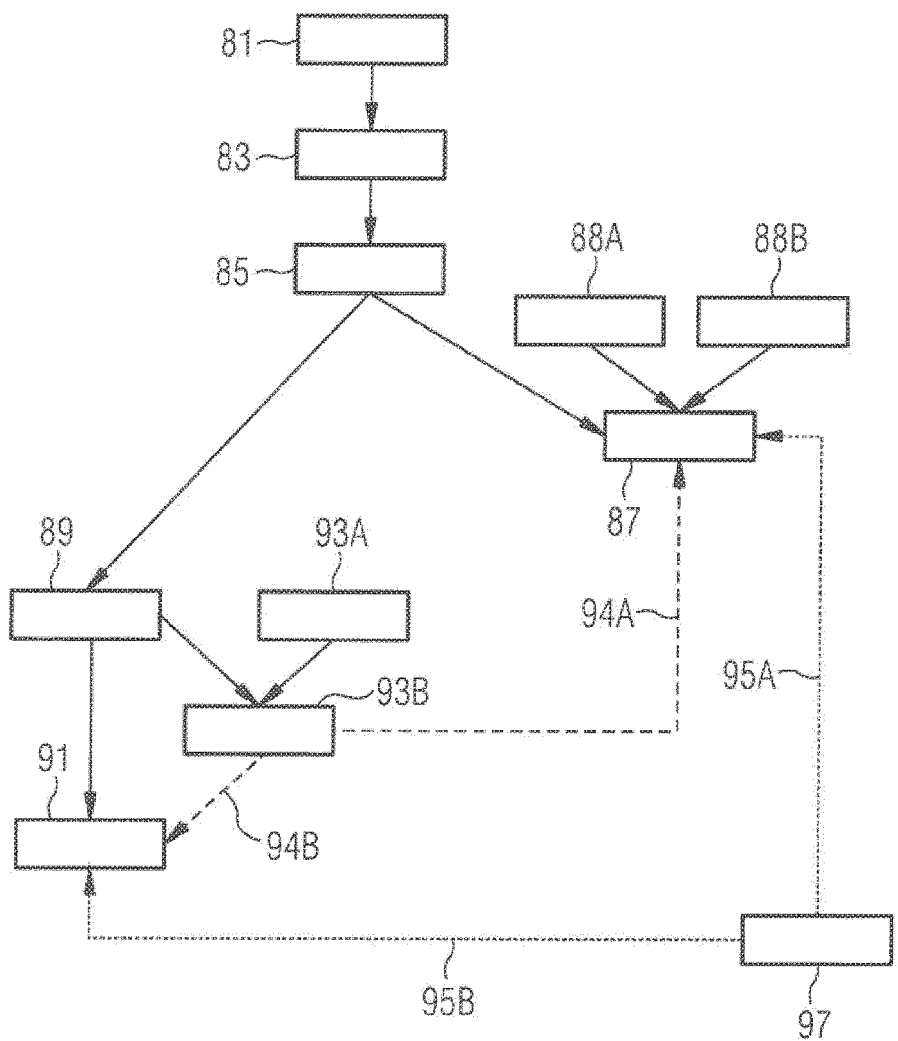

WORKPIECE COLLECTING POINT UNITS AND METHODS FOR SUPPORTING THE PROCESSING OF WORKPIECES

CROSS REFERENCE TO RELATED APPLICATIONS

This application is a continuation of and claims priority under 35 U.S.C. § 120 from PCT Application No. PCT/EP2017/076865, filed on Oct. 20, 2017, which claims priority from German Application No. 10 2016 120 132.4, filed on Oct. 21, 2016. The entire contents of each of these priority applications are incorporated herein by reference.

TECHNICAL FIELD

The present disclosure relates to methods for supporting a sequence of processing steps for processing workpieces by integrating a flow of information into a sequence of processing steps and to workpiece collecting point units.

BACKGROUND

When sorting parts at machine tools, in particular laser cut material or punched workpieces, in particular sheet metal parts, an operator usually visually compares each individual cut part with a drawing of an order of the respective part. Such a mostly paper-based sorting requires an individual search for a special finished part and its assignment to the correct order, so that a corresponding further processing can be initiated. After the processing process, cut or stamped sheet metal parts are often made available to the respective downstream production step in a group. If, in particular, many different part forms are cut, the visual comparison becomes time-consuming and prone to errors. For example, a large variety of parts can cause problems during part recognition and subsequent sorting to, for example, order-specific workpiece collecting point units. If parts are placed incorrectly, a subsequent process can be adversely affected.

EP 1 524 063 A1 discloses a process for marking workpieces in which a sheet is cut or punched. A projector projects different optical markings onto the cut or punched workpieces. This procedure is intended to simplify the sorting of the workpieces for the operator by displaying the workpieces and to provide a process control procedure for further processing or further use of such cut or punched workpieces. In the case of workpieces that are very small, as it is often the case in sheet metal processing, the markings may become difficult to recognize, so that operators also fall back to paper-based sorting.

In the field of logistics, various procedures support workers. For example, WO 2014/028959 A1 discloses a camera-assisted procedure to assist a worker at installations for manipulating goods, EP 1 487 616 B1 discloses a procedure for automatic process control with detecting a work environment, and EP 2 161 219 B1 and DE 10 2014 211353 A1 disclose procedures for visual supporting manual picking operations. Pick-by-Light implementations are also examples of a digitally supported picking process.

SUMMARY

One aspect of this disclosure is based on facilitating allocation, reducing errors when allocating, and/or enabling subsequent processes to be carried out efficiently.

In an aspect, the disclosure provides workpiece collecting units for a machine tool, in particular for a flatbed machine tool such as a laser cutting or punching flatbed machine tool, includes a placing area for workpieces that were generated by the machine tool within the framework of a processing plan; a display unit adapted to display workpiece information to an operator about the workpieces to be further processed placed on the placing area; and a signal device adapted to output an identification signal indicating to an operator the location of the selected workpiece collecting unit for placing the workpiece to be further processed.

A further aspect disclosed herein includes a combined signal/display unit. The combined signal/display unit includes a display that is adapted to display to an operator workpiece information of one or more workpieces associated with the combined signal/display unit. Furthermore, the combined signal/display unit includes a signal output device that is adapted to output an identification signal indicating to an operator the location of the combined signal/display unit, in particular for placing a workpiece associated to the combined signal/display unit. The combined signal/display unit includes further a communication interface for connecting the combined signal/display unit via a data supply system to the control system of a flatbed machines-installation or to a Manufacturing Execution System (MES) of a flatbed machines-installation. Alternatively, the data supply system can be integrated into the combined signal/display unit.

In some embodiments of the workpiece collecting point unit (or the combined signal/display unit), the display unit and/or the signal device are adapted for connecting to the control unit of a machine tool for data exchange, to receive, in particular request, information, in particular about the placed workpieces, and to output the information to an operator. The display unit can be configured to display the workpiece information in a human-readable and/or machine-readable manner. The workpiece information includes information about the number of workpieces to be placed, a subsequent processing step, and/or an underlying order. The display unit can, e.g., be an E-Ink display (also known as an electronic paper display) and/or can be formed as a unit with the signal device. Moreover, the signal device can include a light source such as an LED-based light source, in particular a bright and showy light source, and optionally an acoustic signal source.

In some embodiments, the workpiece collecting point unit includes a structural element: a collecting container, a housing, a pallet, a carriage, or generally a bottom element having a supporting surface. Moreover, the display unit and/or the signal device, a unit including the display unit and the signal device, can be attached in a detachably fastened manner to the structural element of the workpiece collecting point unit.

In some embodiments, the workpiece collecting point unit includes a filling level detection system for monitoring the number of workpieces placed in the workpiece collecting point unit, and/or an input device or an interface to an external input device, and/or a near field monitoring system for exchanging data relating to location information of the workpiece collecting point unit and/or to location information of a nearby transmitter provided, for example, at a hand or on an external input device.

In a further aspect, the workpiece collecting point unit (or the combined signal/display unit) is part of a flatbed machine tool installation, in particular a system with one or more laser cutting or punching flatbed machine tools. The flatbed machine tool can thereby include a processing unit, in particular a laser cutting or punching processing unit, a control unit, in which a processing plan is stored, for controlling the processing unit for generating workpieces, which are arranged spatially next to each other according to a processing image data set, and a sorting table for providing the arranged workpieces for sorting after the manufacturing is completed.

In a further aspect, a communication system of a flatbed machine tool installation for forming an intelligent factory includes at least one flatbed machine tool having a control unit for controlling a workpiece production in accordance with predetermined processing plans, and a manufacturing execution system, with which the control unit is linked and which manages order information relating to the processing plans, wherein the order information includes workpiece information. Furthermore, the communication system includes a plurality of combined signal/display units and/or workpiece collecting point units. The combined signal/display units each include a display unit and a signal output device, whereby the display unit is adapted to display to an operator the workpiece information about one or more workpieces associated with the combined signal/display unit, and the signal output device is adapted to output an identification signal indicating to an operator the location of the combined signal/display unit. The workpiece collecting point units include respective signal devices and a display units, as summarized above.

A further aspect relates to a retrofitting method for retrofitting a flatbed machine tool installation to form an intelligent factory based on a manufacturing execution system. The method includes the step of providing a plurality of combined signal/display units and/or workpiece collecting point units. The combined signal/display units each include a display unit and a signal output device, whereby the display unit is adapted to display workpiece information to an operator about one or more workpieces associated with the combined signal/display unit, and the signal output device is adapted to output an identification signal indicating to an operator the location of the combined signal/display unit. The workpiece collecting point units include respective signal output devices and display units, as summarized above. The method includes further the step of linking the provided plurality of combined signal/display units and/or workpiece collecting point units into the manufacturing execution system.

In some embodiments of the retrofitting method, a flatbed machine tool is retrofitted further with a camera (or a camera system including a plurality of cameras), which is linked into the manufacturing execution system to output image information of a sorting table for image processing for part recognition.

A further aspect relates to a method for supporting a sequence of processing steps for processing workpieces produced with a flatbed machine tool, in particular a laser cutting or punching flatbed machine tool, in accordance with a processing plan, wherein workpiece collecting point units are used for collecting workpieces and at least one of the workpiece collecting point units includes a signal device and a display unit. The method includes the steps of:

comparing the processing plan with a sorting image data set, which was generated by an imaging-based detection of the workpieces, wherein a sorting signal is generated that includes information about a workpiece to be further processed;

selecting one of the workpiece collecting point units associated with the sorting signal;

driving the signal device of the selected workpiece collecting point unit to output an identification signal indicating to an operator the location of the selected workpiece collecting point unit for placing the workpiece to be further processed;

transmitting workpiece information resulting from the sorting signal about the workpiece to be further processed to the selected workpiece collecting point unit; and displaying the workpiece information on the display unit of the selected workpiece collecting point unit.

In some embodiments of the method for supporting a sequence of processing steps, a control of the signal device and/or the display unit is performed under consideration of conditions, in particular described within the description of the drawings.

Furthermore, the method for supporting a sequence of processing steps can contribute in methods for supporting a sorting process of workpieces arranged on a sorting table that have been produced with the flatbed machine tool in line with a processing plan. Such methods include, inter alia, providing a processing image data set of the processing plan on which the arrangement of at least one workpiece was based; imaging based detecting of the sorting table with a plurality of workpieces arranged spatially next to one another and generation of a first sorting image data set; repeated imaging of the sorting table, and generating a second sorting image data set after at least one workpiece of the plurality of workpieces arranged spatially next to one another has been removed from the sorting table; and comparing the first sorting image data set and the second sorting image data set including the processing image data set, wherein a sorting signal is generated, which contains information which includes the type, the position, and/or the shape of the at least one removed workpiece.

In some embodiments, the method for supporting a sorting process can involve one or more of the following steps:

outputting of a placing signal as a function of the sorting signal for supporting the assignment of the removed workpiece by an operator to a subsequent processing step, in particular for placing the removed workpiece at a workpiece collecting point unit;

monitoring a placing operation of the removed workpiece carried out by an operator, wherein monitoring of a placing operation includes, for example, weight monitoring of a specific workpiece collecting point and/or monitoring of a movement trajectory or part of a movement trajectory of the removed workpiece or of an object causing the movement;

outputting a sorting operation completion signal when the placing operation corresponds to a placing operation associated with the sorting signal, and optionally updating a display specific to a workpiece collecting point with respect to the placing of the removed workpiece;

outputting an error signal when the placing operation differs from a placing operation associated with the sorting signal, and optionally displaying information relating to the placing operation assigned to the sorting signal;

monitoring a placing operation of an operator of at least one removed workpiece in a reject collecting point, and assigning the at least one removed workpiece as a rejected piece and optionally entering the rejected piece in a missing parts list;

outputting a supplementary production signal to a production control system;

comparing the production parameters of the removed workpiece to a subsequent processing plan, and if the production parameters correspond to the subsequent processing plan and there is availability of the removed workpiece, supplementing the subsequent processing plan with a production step to generate a replacement workpiece for the rejected workpiece;

an image processing for recognition of the shape of a removed workpiece or of the shape of the empty remaining area on the sorting table and/or image processing for a comparison of the recognized shape with a shape stored in the processing program, for example as part of the step of comparing the first sorting image data set and the second sorting image data set;

an optical acquisition of optical image signals in the visible and/or infrared wavelength range and/or sound wave-based detection of ultrasonic image signals, and a processing of the detected optical image signals and/or ultrasonic signals to form the first sorting image data set or the second sorting image data set, for example, as part of the step of imaging based detection of the sorting table.

Generally, the individual method steps disclosed herein can be processed so quickly with a processing time, in particular partially in parallel, that the generated sorting signal is generated in less than 0.5 s, e.g., in less than 0.2 s, or in less than 0.1 s after removal of the workpiece. In general, the sorting signal can include sub-signals, each of which is assigned to a removed workpiece if, for example, several workpieces are removed. In addition, signals generally can be output as information on an operator's data glasses and/or a control system's monitoring monitor and/or as flashing signals.

Furthermore, the implementation of the method can be performed in conjunction with flatbed machine tools, in particular laser cutting or punching flatbed machine tools, which have a processing unit, in particular a laser cutting or punching processing unit, and a control unit, in which a processing plan is stored, for controlling the processing unit to produce workpieces arranged spatially next to one another in accordance with a processing image data set. Furthermore, the flat bed machine tool can include a sorting table for providing the arranged workpieces for sorting, in particular by the operator, after completed manufacture, and a detection unit for imaging based detection of the sorting table with a plurality of workpieces arranged spatially next to one another and generating at least one first sorting image data set at a first point in time and a second sorting image data set at a second subsequent point in time. In some embodiments of the flatbed machine tool, the detection unit is adapted for optically detecting image signals in the visible and/or infrared wavelength range and/or for sound wave-based detecting of ultrasonic image signals, and includes corresponding sensors.

The concepts disclosed herein and their application in the devices described herein are particularly suitable for reflecting or partially transparent workpieces and can provide advantages in sorting the same. Reflecting or partially transparent workpieces include, for example, workpieces made of sheet metal, glass, semiconductor substrate-structures, printed circuit board-structures, or plastic parts, whereby the materials themselves, and in particular their surface properties, can transmit or at least partially reflect light. With such workpieces the recognizability of projected markings can often be inadequate even for larger workpieces, and that operators can therefore also fall back on paper-based sorting. In contrast, the concepts disclosed herein can increase the efficiency of sorting, especially for such workpieces.

Furthermore, the concepts disclosed herein and their application in the devices described herein can have the additional benefit for the operator that he is not bound to a predetermined control procedure according to which he has to sort the parts. For example, experiments with different operators when sorting with and without the use of the concepts disclosed herein have surprisingly shown that sorting is usually faster and more efficient if an operator can follow his own plan regarding the order of sorting and is not tied to an external specification. This can be due, among other things, to the specific circumstances when sorting workpieces produced with flatbed machine tools. Workpieces produced in this way arrive at the sorting table together with the cut waste, which, for example, is shaped in the form of a residual grid. Due to the separation process, the workpieces can often still be connected to the cut waste (the residual grid) by tiny residual joints (so-called microjoints). When sorting, the operator first separates the workpieces from the rest grid and then sorts them to workpiece-specific trays. If individual workpieces are no longer firmly positioned on the sorting table, or are still connected to the rest grid and thus already hang tiltedly in the rest grid, it can be advantageous for the operator to sort them out first. This procedure applies in particular to bending resistant workpieces, so that the concepts disclosed herein and their application in the devices described herein can also be particularly suitable for the sorting of bending resistant workpieces. A bending resistant workpiece can be made of sheet metal, glass, or plastic, for example. Furthermore, parts cut (or stamped) from a semiconductor substrate or printed circuit board are often resistant to bending.

In general, a flatbed machine tool can be a laser cutting or punching flatbed machine tool that cuts only by laser or cuts only by punching. Furthermore, a flatbed machine tool can be a combination machine which implements both separation processes. Further processing steps such as deburring, bending, folding, welding, drilling, threading, etc. can also be carried out on the flatbed machine tool.

In general, the workpieces are made of sheet metal, glass, semiconductor substrate-structures, printed circuit board-structures and plastic parts. The underlying materials have properties that allow imaging with the respective imaging techniques to be used. With regard to optical imaging, the material properties of the workpieces, and in particular their surface properties, can also transmit or at least partially reflect light in the visible and/or infrared wavelength range without the image data acquisition being significantly influenced. Furthermore, the materials usually have a hard surface that is sound and ultrasonic reflective, and enables ultrasonic-based image data acquisition. The laser cutting or punching flatbed machine tools mentioned above are also commonly used to generate workpieces from a solid material having a flexural strength (stiffness) that does not result in significant deformation during rapid manual sorting.

Furthermore, the concepts disclosed herein and their application in the devices described herein are adapted to provide supportive information in real time if possible. Timely provision is important, because the sorting process, the chronological sequence of which is determined by the flow and speed of the manual procedures of the operator, should not be slowed down (e.g., by waiting for a sorting signal) or at least feedback should be given promptly about activities that were performed (e.g., the correct or incorrect associating to a collecting point). Thus, for example, a correct execution of the bookings of the various sorting operations in real time is important for the implementation of the concepts disclosed herein within an intelligent factory. Only for prompt detection, the system can create reasonable suggestions and make them accessible to the operator. The proposed sorting support automatically carries out the important steps such as imaging, comparison, and entering in the MES, for example, in the background. In general, the components and system structures are configured in such a way that the individual method steps are processed with a short processing time, especially partially in parallel. The sorting signal is generated, for example, in less than 0.5 s, in less than 0.2 s, and in less than 0.1 s after the removal of the workpiece.

In some embodiments, when picking up a, e.g., cut part, it is displayed to an operator in which crate (as an example of a workpiece collecting point unit) the part is to be placed. The display can be optical. However, it is also conceivable, for example, to have an acoustic display or acoustic support for an optical display. Thereby, a specific affiliation of a part can be automatically entered in the higher-level system as soon as the placing was performed. If parts are missing, e.g., due to rejects or machine malfunctions, extra production can be initiated directly via an interface to a production control system (MES). The production control system is part of a multi-layered management system for monitoring and performing at least partially automated production. It is integrated in real time, for example, in the execution, control, or monitoring of the production of individual production steps.

The machine tool system can include a camera (or a camera system of several cameras) for the execution of some of the concepts disclosed herein to be able to capture the entire space of interest. For example, one or more cameras can be permanently installed on the machine housing and provide image information of the sorting table of a flatbed or punch laser cutting machine. After the camera has been calibrated on the sheet metal surface/sorting table, an image processing algorithm for part recognition can be used for the procedures disclosed herein. The cameras integrated into the method for supporting a sorting process thus makes it possible, for example by image processing, to identify a part gripped by the operator, e.g., on the basis of its shape and/or position on the sorting table. The image processing algorithm can access the order information and, thus, simplifying identification of the parts.

Furthermore, a QR code or a material number, for example, can be engraved with a laser or marking laser during processing. With the help of the camera, this coding can be read and then used for identification and supporting the sorting. As an alternative or as a supplement, an operator can use data glasses that can provide supplementary image information for part recognition and which, in addition to the image of the environment actually perceived, display further information, such as the QR code or a material number, within the field of vision.

In some embodiments of the flatbed machine tool, the position of a change in the difference image can be determined with the image processing. As a difference image-based analysis is less disturbed by variance of surfaces, incidence of light, perspective etc. compared to, e.g., classical pattern matching, a higher system tolerance can be achieved. In general, it can therefore be advantageous to dispense with classic pattern matching for workpiece identification, because even small deviations can make it difficult to recognize components with shape-based matching. Especially when observing the scene from a lateral perspective, such a classical image processing approach would be difficult, which is why such approaches have probably not yet been implemented, especially with flatbed machine tools. In contrast, the concepts disclosed herein solve such problems.

In some embodiments of the image processing, a change in the absolute position of the sheet geometry that occurred before or during the processing procedure can be taken into account. This can be done, for example, by information provided by the control unit/the MES about a zero point shift and/or coordinate transformation, for example, which then attributes to the image processing for adjusting the actual position of the raw material in the working area.

By comparing the information obtained from image acquisition and evaluation with the order information, the higher-level sorting system can support workpiece recognition and, for example, identify the intended placing. For example, the tray is marked visibly to the operator on the data glasses and the operator receives feedback as to whether the part has been placed correctly.

With the camera and the comparison of the acquired image information with cutting instructions of the processing plan (e.g., of a cutting program), it can be recognized that a produced workpiece has been removed from the working area monitored by the camera. Via an interface to the MES, one can also determine to which station the part is to be transported next. An optical signal at the workpiece collecting point units, also referred to as load carriers, such as pallets, e.g., Euro-pallets or transport crates, can be controlled in such a way that it is indicated into which one the part must be placed. Optical signals include specific displays, an activation of specific LEDs, or a projection of information onto the load carrier.

An image monitoring and/or a localizing system and/or a sensor system on the load carrier can detect and check the correct placing. With feedback to the MES, for example, a supplementary post-production can be automatically initiated at the next possible point in time for rejected parts that have been placed, e.g., at a reject collecting point.

In general, the concepts disclosed herein can enable an increase in process reliability, an optimization of throughput times and, accordingly, a cost optimization of the production. The concepts disclosed herein can lead to a to some extent considerable time saving in the process from the production of the required number of parts to the placing being correct for a subsequent process, avoid errors in the associating, and enable intuitive workflows by, for example, automatic booking of workpieces. Several orders can be reliably processed in one sheet (e.g., sheet metal to be cut) and a cross-order spanning separation of the cut parts for the respective subsequent processes becomes possible. Handling the complexity of multiple orders on one sheet while sorting enables an automatic (cyclic) new common nesting of all open orders.

Thus, a flexible processing of the part removal and a paperless process flow (with the accompanying time saving in the work preparation), an integration of laser cutting machines or punching machines into the semi-automated manufacturing process can be made more efficient. In addition, error prevention and automatic, correct booking can lay the foundation for data-based real-time control of sheet metal production. Accordingly, machines that are used for the production of small batch sizes can also be integrated into a sheet metal production controlled by the MES within the framework of industry 4.0.

Furthermore, the use of mobile handheld devices such as scanners or tablets that restrict the operator, can be omitted.

Furthermore, including the intelligent workpiece collecting point units disclosed herein can make the production process of an intelligent factory and its indirect processes more efficient. This includes the above explained advantages by outputting signals to an operator during the sorting process, such as displaying the workpiece collecting point unit assigned to a workpiece or the providing of information about erroneously sorted workpieces and subsequent processing steps. However, the linking also includes processes such as the transport to a subsequent processing step, the real-time information on the status of an order and, for example, on the number of workpieces already associated. Together with further localizing devices, it is also possible to communicate the current position of a workpiece collecting point unit to, e.g., the MES and display the same at a control station or to communicate the current position on site, e.g., by flashing or acoustic signals.

DESCRIPTION OF DRAWINGS

FIG. 6 shows a flow chart for illustration of an example of a process flow as described herein in the support of a sorting process.

FIG. 7 shows a flow chart for illustration of an example of a process flow as described herein when communicating with a workpiece collecting point unit.

DETAILED DESCRIPTION

The aspects described herein are partly based on the realization that in laser cutting or punching flatbed machine tools, the presence of a precise cutting plan in combination with an imaging of the sorting table on which the produced cut material is arranged can be used to support a sorting process and to obtain information suitable for further processing procedures.

The concepts described herein relate to flat sheet metal installations that use punching or laser cutting to produce workpieces for subsequent processing steps from so-called sheets (starting sheets of predetermined thickness and predetermined size). A workpiece can be converted into a freely selectable shape, for flatbed machines a flat shape, by very flexible sheet metal processing using laser technology. Subsequent bending and welding processes then generate a product. With such laser cutting or punching flatbed machine tools, a processing plan (e.g., cutting plan) is stored as an input parameter in the machine control, wherein the processing plan contains the exact shapes and relative positions of the produced workpieces in relation to each other. In addition to the (cutting) processing plan, one can also use additional information obtained during the processing procedure, such as a coordinate transformation for adapting the (cutting) processing plan to the actual position of the raw sheet. Such information is, for example, stored in the control unit linked to the (cutting) processing plan and, if necessary, also communicated to the Manufacturing Execution System MES.

Shrinking batch sizes, e.g., the need to be able to produce small quantities in short time windows, and individualized products are current challenges for punching or laser cutting; these challenges have a particular impact on the automation of production processes in sheet metal manufacturing companies. The concepts described herein can coordinate and integrate IT-supported processes, especially for smaller batch sizes, assign these to individual machines, and play a role in an adaptable creation of the production plan.

There are high demands of a wide variety of products in so-called intelligent factories ("smart factories"). The potential for more efficient design of manufacturing processes lies in indirect processes, e.g., the steps taking place before and after the separation process. For example, by enabling more efficient and error-free sorting and compensating for rejected workpieces, one can shorten the throughput time of an order across all manufacturing processes and one can achieve a more efficient utilization of the intelligent factory.

Transparent manufacturing planning, in which indirect processes are interlinked, provides an overview of production processes and allows their optimization. The operator becomes a process manager who controls the material flow with his oversight, especially for orders with small batch sizes.

Figure 1:
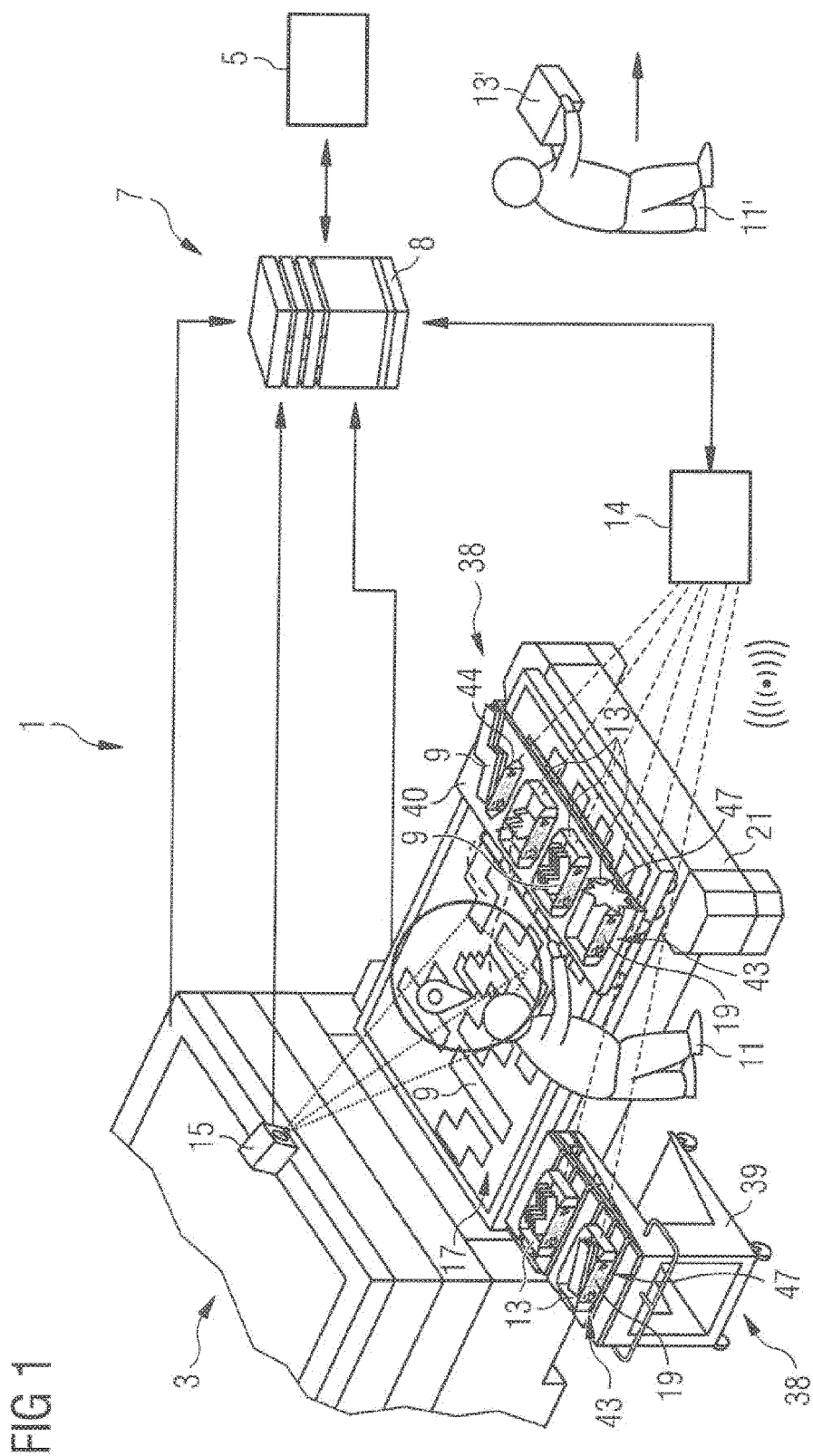
FIG. 1 shows an illustration of a portion of an intelligent factory with a laser cutting or punching flatbed machine tool.

FIG. 1 shows an overview of an intelligent factory 1 ("smart factory") that includes self-adapting production resources, such as a laser cutting or punching flatbed machine 3 shown as an example, and an associated MES 5. Usually several such flatbed machine tool installations constitute the intelligent factory. In a network 7, the virtual and physical production elements and production steps, especially the information about workpieces 9 (required number, shape, material, type . . . ) come together in the MES 5. A control unit 8, such as a PC, computing node or similar suitable hardware, is used to control the flatbed machine 3 and other components assigned to it. The control unit 8 is especially configured to support sorting during real-time operation of the intelligent factory. The underlying computing system includes, for example, digital processor systems with microprocessor circuits having data inputs and control outputs, the processor systems being operated according to computer-readable instructions stored on a computer-readable medium. Typically, the control unit 8 includes high computing power for real-time support and long-term (non-volatile) memory for storing program instructions as well as very fast short-term (volatile) memory for storing captured data and evaluation results during (or resulting from) image data capture and image data processing.

FIG. 1 also shows two sorting devices 38, a carriage 39, and one as a bridge 40 that is movable over the sorting table 21. The sorting devices 38 each include several workpiece collecting point units 13. Each workpiece collecting point unit 13 has a display unit 43 with a display 19 and a signal output device 47.

The display unit 43 can be an easily replaceable unit, e.g., with a transmitter-receiver unit and a cable-independent power supply, e.g., with batteries, accumulators, or capacitors. The display unit 43 can be arranged e.g., attached, at the workpiece collecting point unit 13, e.g., by clamping, screwing, or magnetic adhesion.

The signal output device 47 can be integrated into the display unit 43 or can be arranged externally from the display unit 43. A signal output device 47 integrated in the display unit 43 has the advantage that it can use the power supply and the transceiver unit together with the display unit 19.

Figure 5:
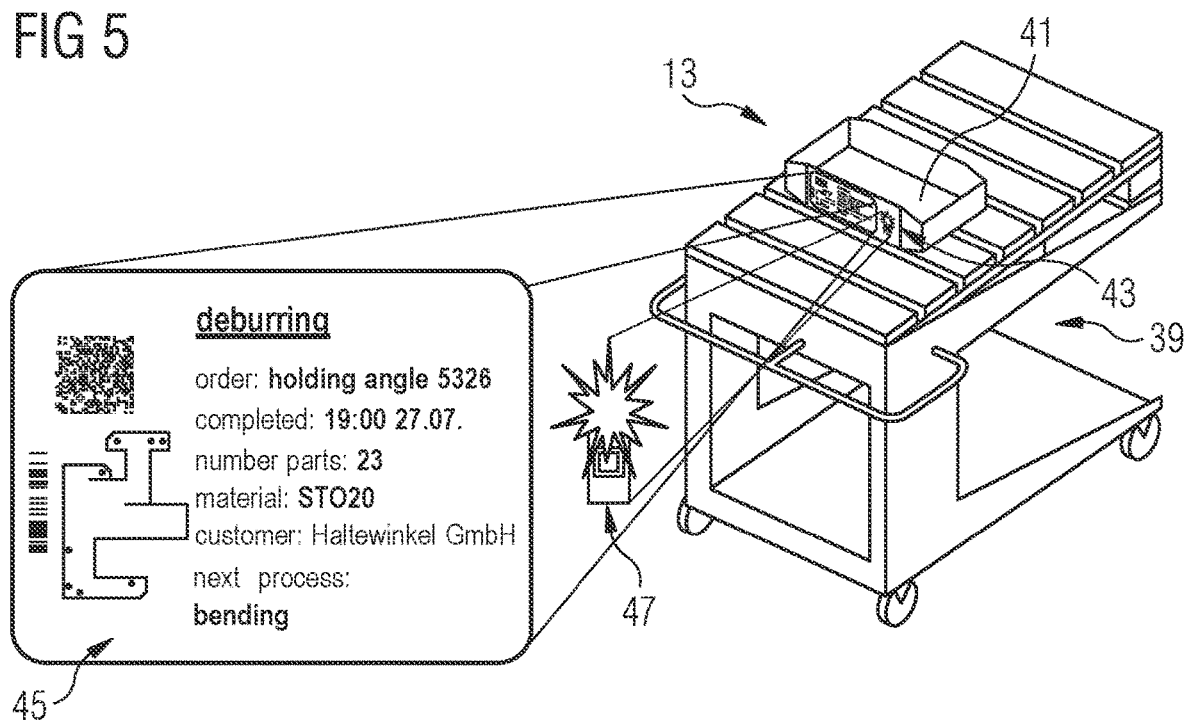
FIG. 5 shows an illustration of an example of a workpiece collecting point unit.

The workpiece collecting point units 13 in FIGS. 1 and 5 in the exemplary embodiments include collecting containers that have, for example, a bottom on which the workpieces are placed (as an example of a placing area for workpieces) and optionally one or more side walls. In FIG. 1, the display unit 43 exemplarily is attached to a longitudinal side wall of the collecting container at the outside. In general, the workpiece collecting point unit can include a structural element such as the collecting container, a housing, a pallet, a carriage, or, in general, a bottom element having a support surface.

In some embodiments, the workpiece collecting point unit 13 (alternatively to a collecting container) can generally have a location intended for the workpieces 9 (the placing area for workpieces). This can be, for example, an area on the sorting device 38, e.g., a pallet on a carriage. This allows for larger placing areas for large workpieces. These defined areas can also be used if the sorted workpiece 9 that is to be assigned to an order is a single piece or if there are only a few workpieces 9 in a small batch.

Especially with large and bulky workpieces, such placing areas are assigned to the workpieces that then become part of the processing process with a unit that is positioned close by and assigned to the workpieces. The unit includes a display unit 43 and a signal output device 47—a combined signal/display unit 44 is shown in FIG. 1 on the bridge 40.

In general, the workpiece collecting point unit can include a structural element. Examples of the structural element are the collecting container, a partly open housing/receptacle, a pallet, a carriage, or generally a structural element with a supporting surface. Usually the placing area is formed by the support surface of the structural element, e.g., a bottom of the collecting container, a placing surface on the carriage, or a top side of a pallet that is used to transport, e.g., larger workpieces. In varying processing processes, the placing area can change from one structural element to another structural element, whereby the display unit 43 and/or the signal output device 47, for example, can be reconnected. Alternatively, the visualization can be reprogrammed from one display unit 43 (and/or signal output device 47) to the other display unit 43.

An operator 11 sorts the workpieces 9 taken from a sheet 17 output by the flatbed machine 3 to the workpiece collecting point units 13. After removing the workpieces 9, the corresponding signal output device 47 indicates to the operator in which workpiece collecting point unit 13 he is to place the workpiece 9. The display 19 shows the status (general workpiece information), e.g., the number of stored workpieces 9, how many are still missing, or whether an error has been detected.

An operator 11, who as an "augmented operator" is provided with comprehensive information in real time, and controls and monitors the manufacturing. As an expert and decision-maker, the operator 11 retains the final decision-maker function in all relevant processes of the production network. Thus, the operator can influence targets situationally and contextually, supported by IT-based assistance systems, such as the method for supporting a sorting process disclosed herein and the workpiece collecting point units 13 disclosed herein.

With regard to production planning, the flatbed machine 3 is a "social machine" that is in contact with other components and that is intelligently interlinked with the order control and the MES 5. Thus, for example, it can react to possible deviations in the cutting process independently and depending on the situation.

In traditional manufacturing, an operator would repeatedly pick up work papers relating to orders, manually start orders, sort parts, and associate these to work progress slips and setup plans. This means that the machine can often stand still for long periods of time.

In contrast, interlinked production in the intelligent factory 1 optimizes its indirect processes and provides an overview of the production processes to be carried out. The operator 11 becomes the process manager who keeps track and controls the material flow.

In general, picking up and sorting parts, for example, cut parts, is time-consuming, error-prone, and a great challenge with several orders produced from one blank. With the concepts proposed herein, manufacturing orders for small quantities per batch, for example, can be efficiently sorted for nested parts.

As will be explained in more detail below, the use of an imaging system, e.g., a camera 15 with image processing and an automated localizing of the hand of the operator 11 makes it possible to detect which workpiece 9 was removed from a sheet 17 and output by the flatbed machine 3. At one of the intelligent and interlinked workpiece collecting point units 13, a display 19 can then give a sign and show the operator 11 the sorting location assigned, for example, by the MES 5 (see also steps 63, 65 in FIG. 6). Localizing the hand can also enable the placing operation to be booked in the MES 5. In addition, the workpiece collecting point units, which are designed as intelligent crates, for example, can output current order information received from the MES 5 on, e.g., an e-Ink display. They enable, e.g., an (possibly spatially rough) electrical localization and can enable an intuitive "fine search" for the operator, for example, by flashing. For example, the workpiece collecting point units 13 are connected to their own data supply system 14 that is connected to the MES 5 and the control unit 8 for data exchange.

After a number of required workpieces have been sorted into a workpiece collecting point unit 13', an operator 11' (or automated robot system) takes the workpiece collecting point unit 13' to a subsequent processing step.

An electronic assistant that supports the operator 11 on the information side by providing situational information. This allows the operator 11 to continue implementing individual preferences (such as: where do I start, do I create small hand buffers or not . . . ) in the sorting process. Steps include: observing, evaluating, and providing the information required for the situation.

Figure 2:
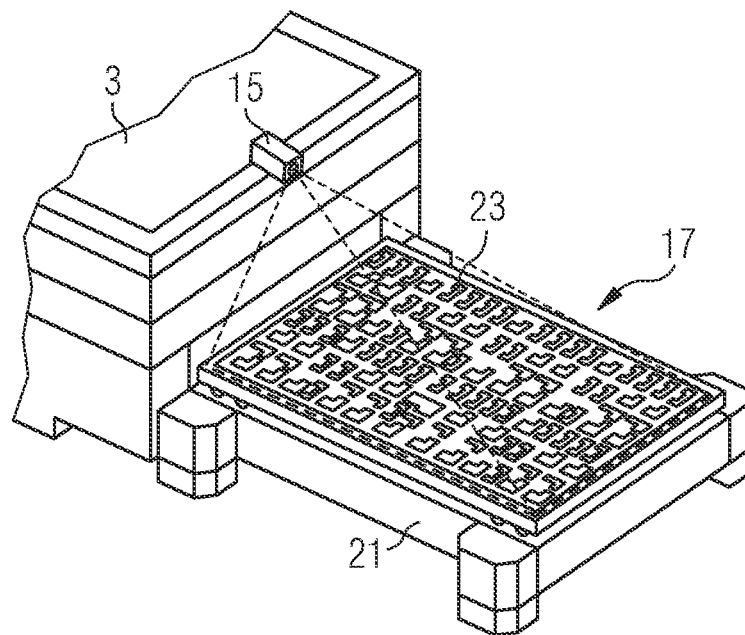
FIG. 2 shows an illustration of an example of an arrangement for the imaging detection of a sorting image data set.
Figure 3:
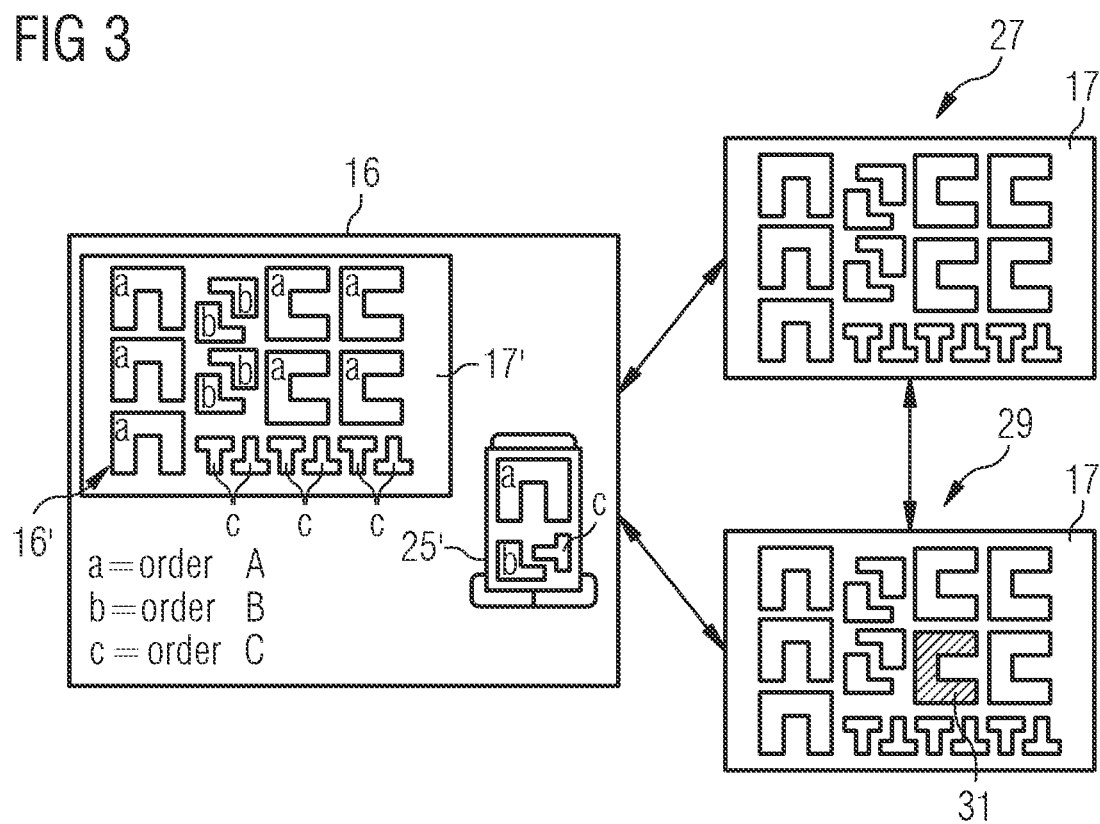
FIG. 3 shows illustrations of a processing image data set of a processing plan and two detected sorting image data sets.

FIGS. 2 and 3 show exemplarily how a sorting image data set is obtained with a camera system including the camera 15 for imaging detection and processing (see also steps 53, 55, 57 in FIG. 6). To detect removed parts, the camera 15 detects the sorting table 21 of the flatbed machine 3, and the working space 23 above the already-processed sheet that is to be sorted. The sorting is carried out by an operator 11, in the exemplary embodiment of FIG. 1 shown in the form of a living human being, (not a robot). To determine the position of the, e.g., cut, sheet on the pallet, the camera 15 is calibrated to the machine coordinates. The camera 15 is part of an imaging system that for example, optically records an image of the sorting table 21 with the parts to be sorted in the visible and/or infrared wavelength range and/or with sound waves such as ultrasonic waves. Accordingly, the camera includes a sensor system for recording image signals in the wavelength ranges. The imaging system includes an image processing unit for generating the image from the image signals.

The control unit 8 with interface to the camera 15 and to the flatbed machine 3 uses suitable image processing methods (e.g., difference image generation) to detect when a workpiece 9 is removed from the sorting table 21. The software uses the interface to the flatbed machine 3 to reconstruct the layout on the sheet 17 and the contours of, e.g., cut workpieces 9 from the processing program. FIG. 3 shows schematically a processing plan 16 with a processing image data set 16' that was the basis for the arrangement of at least one workpiece 9 on the sorting table 21 (see also step 51 in FIG. 6). There are exemplarily planned shaped parts in three types a, b, c on a schematic sheet 17', the shaped parts are assigned to three orders A, B, C. It can also be seen that the shaped parts produced are to be sorted into three stacks according to the types a, b, c on a carriage symbol 25' as workpiece collecting point units.

FIG. 3 also schematically shows a first camera image 27 of the sheet 17 with the shaped parts cut out of the sheet 17, the image being captured at a first point in time immediately after the cutting process; that is before the first removal of a shaped part. Another camera image 29 shows the sheet 17 after the first removal of a shaped part a (dotted area 31 in FIG. 3), e.g., at a second point in time (after the first point in time).

By continuously generating a difference image, for example, between the real camera image and a reference image, a comparison with, for example, a virtual superposition of the processing image data set of the CNC program or of a type of a shaped part can be done. Thereby, it can be identified in a clear manner when a part has been removed. The reference image can be updated with the new scene after each removed part.

The comparison can also be carried out by tracking the absolute position of the sheet with the workpieces cut out. This can be done, for example, by additionally detecting the outer edges of the blank sheet. Tracking allows compensation for a global displacement of the arrangement, e.g., by the manual intervention of the operator.

Furthermore, the flatbed machine 3 can have a laser system for engraving workpiece-specific QR codes or material numbers (e.g., an additional marking laser or a correspondingly adjustable cutting laser). If a workpiece has been provided with a QR code or a material number during processing, the camera system can then additionally recognize and read out this coding. This can allow a workpiece to be assigned more quickly, e.g., as workpieces that are assigned in the processing plan and are to be generated, and/or to further processing steps stored in the MES 5.

To be able to inform the operator 11 about what is to happen next with the removed part (it is classically placed in a crate at workpiece collecting point unit 13 for further transport), the control unit 8 has access to the MES 5. Not only the next location (in which crate the part must be placed), but also other information such as material, order number, customer, etc. is stored therein.

The workpiece collecting point units 13 also have a communication interface to the control unit 8 and can output information on the order, e.g., via an E-Ink display as display 19. Via the interface, the workpiece collecting point units 13 are thus also in a position to indicate to the operator 11, who is picking up a workpiece 9, in which crate he has to place it (see also step 59 in FIG. 6). A built-in scale or another suitable sensor unit can be used to determine whether the operator 11 has placed the workpiece 9 in the correct crate (see also step 61 in FIG. 6). Accordingly, feedback can be sent, e.g., via a counter on the E-Ink display. Thus, in control unit 8, a determination can be made as to whether all parts have been sorted correctly or whether parts of the order are missing that, for example, have fallen through the residual grid.

It is also conceivable that the operator 11 recognizes a faulty part during sorting and places it in a collecting point provided for rejects (see also step 69 in FIG. 6). In another case, the flatbed machine 3 automatically records faulty cuts, manual operator interventions or even collisions during sheet processing and records the affected parts as rejects via the interface to the control unit 8. For such cases, an order for the post-production of the identified rejects can be automatically created in the MES 5 and planned (see also step 73 in FIG. 6).

By extending the system with an interior localization and interfaces to the control unit 8, the positions of the workpiece collecting point units can further be determined and/or the movement of the hand of the operator 11 can be detected. Such a localizing can be done, e.g., via an ultra-wideband system of four or more so-called "anchors" and one or more "tags". The anchors serve as receivers and can be positioned and stationary around the working area 23. The tags are attached to all workpiece collecting point units and the hand of the operator 11, and are used to determine their position. Further interior localizing systems include Bluetooth, Wi-Fi, infrared and RFID, for example.

Figure 4:
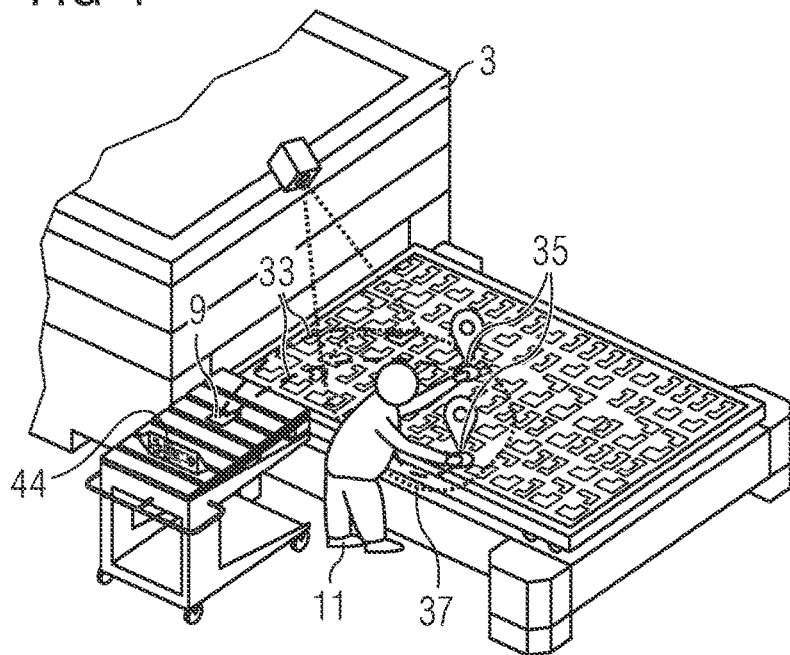
FIG. 4 shows an illustration of an example of a monitoring of a placement procedure of a removed workpiece.

As shown in FIG. 4, tracking of the hand of the operator 11 can determine whether the workpieces 9 were placed in the correct crates or at an exemplarily shown signal/display unit 44. As an example, movement trajectories 33 of the hand when removing a workpiece 9 are shown in FIG. 4. Furthermore, the tracking information can be used to improve the procedure for detecting a part that has been removed. By localizing the hand (e.g., positions 35), its motion trajectory or a part of the motion trajectory, a region of interest 37 is defined in the image area. The image processing does not have to search the entire workspace 23 for changes in each calculation step, but only the region of interest 37 around the hand of the operator 11. If several operators 11 work during the sorting process, a region of interest 37 can be defined simultaneously for each operator 11 at the sorting table 21. Each operator 11 can thus be provided with individual information on the correct placing location of the workpiece.

In addition to the previously mentioned approach of executing the logic and computing power in a central computing node (control unit), other known topologies can be used for linking flatbed machine 3, camera 15 (generally an imaging system), crates with workpiece collecting points 13, MES 5, and localizing systems.

In addition, the function of displaying data at the storage location and the control of the placing can be performed with data glasses. Such "augmented reality" glasses can be used to display not only the location of the correct placing location but also its target height. For example, Hololens® data glasses can be used to display holographic 3D objects at a fixed location. Thereby, the operator 11 can easily check whether a stack of workpieces is complete.

In further embodiments that use data glasses, the parts are visible to the operator 11 after part generation in a residual grid-parts-group. Via the control unit 8 and the MES 5, it is known which part is at which position in this group and where it is to be placed. With the data glasses, the operator 11 receives a feedback as to whether the part was successfully detected or a proposal for a retry strategy.

One can suggest to the operator 11 also an optimal sorting strategy via the projection screen of the data glasses, even if he can still sort according to a self-chosen strategy. With many small parts, for example, one can suggest to the operator to remove several identical parts at the same time. Using an algorithm, it is possible to calculate and display in real time how many parts can be removed at a time, depending on the size and weight of the individual parts, for example. This can also be individually adjustable depending on the operator. Furthermore, if the operator 11 has picked up a shaped part of type a, the position of other parts of the same type, for example along a favorable movement trajectory, can be displayed to the operator 11. This can, for example, avoid unnecessary paths.

After a removed part has been successfully read in, the control unit 8 as a control system outputs the correct placing location to the operator 11, e.g., via the projection screen of the data glasses. This could be, for example, a numbered storage compartment. If the storage compartment is at a more distant location, the projection surface of the data glasses can be used to refer via a map to the storage area. The supporting camera of the data glasses can also recognize the storage compartment as soon as it is within the visible area and mark it on the projection surface.

The control system also monitors whether the part has been placed in the correct compartment during the placing procedure and provides feedback to the operator 11 via the projection surface of the glasses. Various data glasses available on the market that ideally have their own GPS coordinate system or can be coupled to an external positioning system, can thus be integrated into the systems proposed herein.

FIG. 5 shows a workpiece collecting point unit 13 on a carriage 39. The workpiece collecting point unit 13 includes a placing area 41 for workpieces 9 generated by a machine tool as part of a processing plan. The workpiece collecting point unit 13 also has a display unit 43 configured to receive from the control unit 8 of the machine tool, information 45 about the workpieces placed at the workpiece collecting point unit 13, and to output the information to an operator.

For example, display unit 43 is configured to receive and output information on the number of placed workpieces 9, missing workpieces, a subsequent processing step, an underlying order (customer), target material, and so on.

The display unit 43 can be a real display unit, for example an E-Ink display, attached to the carriage 39. Alternatively or in addition, a digitally emulated display unit can be used within a control representation, for example, within a user interface displayed on a tablet, for example.

In addition to E-Ink displays, display data and crate feedback can also be provided by activating a signal emitting device, such as one or more LEDs, an active LCD display, an acoustic signal source, or by projection with a beamer or laser scanner, when a placed part is detected. In addition, (supplementary) control measurements of the correct placement with a scale, a height measurement of a stack (optical measurement methods, such as laser scanners), or an image-based control (camera counting systems) can be used. A vibration sensor (e.g., an acceleration sensor) can also be used (in addition). Generally, the signal output device 47 is adapted to output feedback signals to an operator.

As mentioned above, the display unit 43 and the signal output device 47 can be combined into one unit that is also referred to herein as a combined signal/display unit.

Combined signal/display units are used in the frame of the communication system disclosed herein and—together with mobile workpiece collecting units—enable retrofitting of installations of flatbed machine tools to intelligent factories.

In addition to display units 43 and signal output devices 47 that are permanently connected to a structural element, combined signal/display units can also be used as independent units in the course of the process, as they can be assigned to one or more workpieces if the geometry of the workpieces does not permit the use of load carriers, for example, in a reasonable manner. An operator can then take the combined signal/display units together with the assigned workpieces from one processing step to another.

FIG. 6 shows a flow chart to illustrate an exemplary method procedures in the support of a sorting process. It is assumed that workpieces are arranged on a sorting table that have been produced with a flatbed machine tool such as a laser cutting or punching flatbed machine tool as described above, based on a processing plan.

In control unit 8, a processing image data set of the processing plan (see, e.g., the processing image data set 16' in FIG. 3) is provided (step 51) that was the basis for the arrangement of the generated workpieces. Furthermore, the sorting table is imaged with the plurality of workpieces arranged spatially one next to the other, e.g., optically in the visible or infrared wavelength range, or with sound waves or ultrasonic waves, to generate a first sorting image data set (see, e.g., the first camera image 27 in FIG. 3) (step 53).

This is followed by a removal of at least one workpiece from the sorting table (step 54) and a repetition of the imaging acquisition of the sorting table based on which a second sorting image data set is generated (step 55).

Now the first and the second sorting image data sets are compared (step 57) with the processing image data set—for example with an image processing algorithm—to generate a sorting signal. The sorting signal includes information about the type, position, and/or shape and optionally localizing information of at least one removed workpiece. It can also indicate whether and how to proceed with the at least one removed workpiece. The sorting signal can be transmitted to the control unit 8 and/or the MES 5 and can trigger downstream processes.

The comparison of the first sorting image data set and the second sorting image data set can include image processing to detect the shape of a removed workpiece or the shape of the area left blank on the sorting table, and/or image processing to compare the detected shape with a shape stored in the processing program.

Furthermore, a placing signal can be output as a function of the sorting signal to support the assignment of the removed workpiece by an operator to a subsequent processing step (step 59). For example, a placing of the removed workpiece according to an order is prompted at a workpiece collecting point corresponding to the order. This can include, for example, a flashing of an associated crate, a special displaying on a display associated with the crate, and/or the blending in of a marking of the associated crate into a display of data glasses.

A placement process (step 60) of the removed workpiece carried out by an operator can be monitored (step 61). Monitoring the placing operation includes, for example, monitoring the weight of a specific workpiece collecting point and/or monitoring a motion trajectory or a part of a motion trajectory of the removed workpiece or an object causing the movement (see, e.g., FIG. 4).

If the placing operation corresponds to a placing operation associated with the sorting signal, a sorting completion signal can be output (step 63), e.g., again by a flashing signal, special outputs on a display of, e.g., the workpiece collecting point unit, and/or a marking in the display of the data glasses. For example, a workpiece collecting point-specific display can be updated with regard to the placing of the removed workpiece (step 65).

If the placing operation deviates from a placing operation associated with the sorting signal, an error signal can be output (step 67), for example again by a flashing signal at the workpiece collecting point unit, special outputs on a display at the workpiece collecting point unit, and/or a marking in the display of the data glasses. Information regarding the correct placing operation assigned to the sorting signal can also be displayed repeatedly at the same time.

In addition, it can be monitored, for example, whether at least one removed workpiece was placed by an operator at a reject collecting point during a placing operation (step 69). The removed workpiece can be noted by the MES 5 as a rejected part, e.g., optionally entered in a list of missing parts (step 71).

A supplementary production signal can be output to a production control system for detected rejected parts. Here, for example, the production parameters of the removed workpiece are compared with a subsequent processing plan. If the production parameters correspond to the following processing plan and if a new production of the removed workpiece is available, the following processing plan can be supplemented with a production step for the production of a replacement workpiece for the rejected part (step 73). The generation of a replacement workpiece can also be provided for in later subsequent processing plans.

As indicated by dashed paths in FIG. 6, various steps of the method can be repeated to ensure continuous real-time monitoring and support of the sorting operation.

FIG. 7 shows a flow chart that illustrates an example of a process flow of the communication with a workpiece collecting point unit. This is explained in relation to the intelligent workpiece collecting point unit shown in FIG. 1.

The steps explained in FIG. 6 are used to compare (step 81) the processing plan stored, for example, in MES 5 with a sorting image data set. This was generated by imaging the workpieces (step 53 in FIG. 6). Based on the comparison, a sorting signal is generated (step 83) that includes information about a workpiece to be further processed.

Several workpiece collecting point units are available for sorting the produced workpieces, whereby each of the workpiece collecting point units is assigned to specific workpieces and accordingly to a specific subsequent processing step. The assignment can take place with the sorting of a first workpiece by the operator or it can be carried out centrally, e.g., by the MES 5.

Based on the sorting signal, the control unit or the MES selects the workpiece collecting point units (step 85) associated with the sorting signal, and establishes a communication link.

The communication link allows driving the signal device of the selected workpiece collecting point unit to output an identification signal (step 87). The identification signal indicates to the operator the location of the selected workpiece collecting point unit for placing the workpiece to be processed further. The operator's attention is directed to the workpiece collecting point unit.

As indicated in FIG. 7, the identification signal can be output each time a sorting signal is generated. The identification signal can further be output if, for example, a localizing request is made to the selected workpiece collecting point unit (step 88A) and/or if a close-range sensor of the workpiece collecting point unit is activated, for example, when searching for the workpiece collecting point unit or when placing a workpiece (step 88B).

The communication link also allows transmitting workpiece information resulting from the sorting signal about the workpiece to be further processed to the selected workpiece collecting point unit (step 89). The workpiece information is displayed on the display unit of the selected workpiece collecting point unit (step 91). For example, the selected workpiece collecting point unit requests the workpiece information belonging to the sorting signal from a control unit of the machine tool and displays this human-readable and/or machine-readable on a display of the display unit.

The presence of the workpiece information can now be used to support the sequence of processing steps for processing workpieces. For example, a number of workpieces placed in the workpiece collecting point unit can be detected (step 93A) and compared with a target number (step 93B) that was provided as part of the workpiece information of the workpiece collecting point unit. The number of placed workpieces can be determined on the basis of the imaging based detection of the sorting table by monitoring a pick-up process of a removed workpiece carried out by an operator, and/or by monitoring the weight of the workpiece collecting point unit. As shown by the dashed arrow connections 94A and 94B in FIG. 7, when the target number is reached, a further identification signal can be output by the signal device and/or information regarding the next processing step can be displayed by the display unit, the information being provided as part of the workpiece information to the workpiece collecting unit.

As further illustrated with the dotted arrow connection 95A in FIG. 7, the signal device of the selected workpiece collecting unit can be controlled to output a sorting process completion signal if, for example, the imaging based detection (step 97) has detected that a workpiece placing process has been carried out correctly. Thereby, the display unit of the selected workpiece collecting point unit can also be updated with regard to the displayed number of workpieces (dotted arrow connection 95B). Similarly, the signal device of the selected workpiece collecting point unit can be controlled to output an error signal if the workpiece placing process has not been carried out to the correct workpiece collecting point unit.

With reference to FIG. 1, in the steps described above, the communication can be based on a data link between the workpiece collecting unit 13, via its display unit 43 and its signal device 47, to the control unit 8 of the machine tool 3 and, thus, to the MES 5. The data exchange can generally be done via data cable (all common data connections (CAN, Profibus, RS232, RS485, USB, LAN etc.). The data exchange can also be done via infrared or radio (WLAN, Wi-Fi, etc.). As shown as an example in FIG. 1, the workpiece collecting point units 13 with their own data supply system 14 are wirelessly connected to the MES 5 and the control unit 8 for data exchange.

The communication further allows an operator to be provided with information directly at the workpiece collecting point unit, e.g., information received from the MES 5. The information that can be made available includes workpiece-specific information (herein also referred to as workpiece information) that refers to the manufacturing process and the associated data of the workpieces, which are stored in the workpiece collecting point unit. The information that can be made available can include information about the workpiece collecting unit itself such as its position, and can be communicated optically and/or acoustically as an identification signal via the signal device.

The workpiece information can, for example, be provided via a display unit in an energy-saving and battery-operated manner. The display unit can be fixedly connected to the workpiece collecting point unit or it can be attached to it at the beginning of the use of a workpiece collecting point unit. In any case, an order for processing workpieces is usually permanently assigned to a workpiece collecting point unit. Thereby, if the crate or pallet or the load carrier in general is carried to a next workplace, the display unit 43, e.g., controlled by a higher-level control software, can simplify the operational sequence and, for example, display the next work step.

The workpiece collecting point unit 13 can also be integrated into a localization system. For example, with an appropriate system in a machine tool hall with several processing machines and/or workstations, a localization can be made possible via transmitter-receiver systems. An operator, who monitors and controls the processing operation in a control center, can see on his monitoring monitor where a specific order is currently located in the process chain and what its status is. Accordingly, he can also access the display unit directly to adapt displayed data (workpiece information) such as preferences, work steps, etc. Alternatively or in addition, this can be done on site with an input device at the workpiece collecting point unit (e.g., pushbutton, switch, touchpad) or via a data interface that provides access to an external, e.g., mobile input unit (smartphone, IPad, Smartwatch, etc.). Correspondingly, the workpiece collecting point unit has, for example, a near-field radio network (Bluetooth, NFC). This can also be used, for example, as part of a near-field localization system for locating the workpiece collecting point unit. The latter makes it easier to find a workpiece collecting point unit if, for example, it is hidden in a large number of workpiece collecting point units. For example, one controls the workpiece collecting point unit specifically such that the signal device (e.g., a brightly lighting LED) is activated.

The near-field localization can further be used, for example, when sorting if, e g., the position of a hand (in particular an intelligent glove that interacts with the localization system) is localized by the workpiece collecting point unit. If the "hand" of an operator removes a part from the residual grid, the location of the part is registered from the residual grid to the hand within the MES 5. If the hand moves near a localization system of the workpiece collecting point unit, the MES 5 registers that this part has been placed at the associated workpiece collecting point unit. The localization system can detect that the hand with the workpiece approached, and a higher-level system (e.g., the MES) can link the workpiece collecting point unit and the position of the hand.

The disclosed workpiece collecting point unit 13, the flatbed machine tool 3, the communication system, and/or the method can also be used for workpieces 9 and/or shaped parts a, b, c with more than four corners and/or more than four edges.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for supporting a sequence of processing steps for processing workpieces produced with a flatbed machine tool in accordance with a processing plan, wherein workpiece collecting point units are used for collecting workpieces and at least one of the workpiece collecting point units includes a signal device and a display unit, the method comprising:
   comparing the processing plan with a sorting image data set generated with an imaging based detection of the workpiece;
   generating a sorting signal including information about a workpiece to be further processed;
   selecting one of the workpiece collecting point units associated with the sorting signal;
   driving the signal device of the selected workpiece collecting point unit to output an identification signal indicating to an operator a location of the selected workpiece collecting point unit for placing the workpiece to be further processed;
   transmitting workpiece information resulting from the sorting signal about the workpiece to be further processed to the selected workpiece collecting point unit; and
   displaying the workpiece information on the display unit of the selected workpiece collecting point unit.

2. The method of claim 1, further comprising outputting the identification signal by the signal device in response to a localizing request to the selected workpiece collecting point unit or upon activation of a near field sensor.

3. The method of claim 2, wherein the signal device is controlled for outputting an identification signal so that the attention of an operator is directed to the workpiece collecting point unit.

4. The method of claim 1, further comprising:
   requesting the workpiece information related to a sorting signal from a control unit of the machine tool by the selected workpiece collecting point unit; and
   displaying the received workpiece information with the display unit of the selected workpiece collecting point unit.

5. The method of claim 1, further comprising:
   detecting a number of workpieces placed at the workpiece collecting point unit;
   comparing the number with a target number provided as part of the workpiece information of the workpiece collecting point unit; and
   outputting the identification signal by the signal device when the target number is reached or outputting information relating to the next processing step, or by both.

6. The method of claim 5, wherein detecting the number of workpieces placed at the workpiece collecting point unit is performed based on the imaging based detection of a sorting table of the machine tool to monitor a placing operation of a removed workpiece carried out by an operator.

7. The method of claim 1, further comprising driving the signal device of the selected workpiece collecting point unit to output a sorting operation completion signal when it is detected that a workpiece placing operation has been performed correctly.

8. The method of claim 1, further comprising updating the display unit of the selected workpiece collecting point unit with respect to a displayed number of workpieces.

9. The method of claim 1, further comprising driving the signal device of the selected workpiece collecting point unit to output an error signal when the workpiece placing operation has not been performed at the workpiece collecting point unit.

10. The method of claim 1, further comprising comparing location information of the workpiece collecting point unit and location information of a hand moving a sorted workpiece, wherein the workpiece is booked to the workpiece collecting point unit for a positive comparison.

11. A flatbed machine tool comprising:
a processing unit;
a control unit in which a processing plan is stored for controlling the processing unit to generate workpieces arranged next to one another in accordance with a processing image data set;
a sorting table for supporting the arranged workpieces for sorting after generation; and
a workpiece collecting point unit for a machine tool, comprising:
a placing area for workpieces generated by the machine tool within a framework of a processing plan;
a display unit adapted to display workpiece information to an operator about a workpiece to be further processed that was placed on the placing area; and
a signal device adapted to output an identification signal indicating to an operator a location of a selected workpiece collecting unit for placing the workpiece to be further processed,
wherein the display unit is connected to the control unit of the flatbed machine tool and is further adapted to receive workpiece information about the placed workpieces and to output the information to an operator, and the control unit is adapted for performing a method comprising:
comparing the processing plan with a sorting image data set generated with an imaging based detection of the workpiece;
generating a sorting signal including information about a workpiece to be further processed;
selecting one of the workpiece collecting point units associated with the sorting signal;
driving the signal device of the selected workpiece collecting point unit to output an identification signal indicating to an operator the location of the selected workpiece collecting point unit for placing the workpiece to be further processed;
transmitting workpiece information resulting from the sorting signal about the workpiece to be further processed to the selected workpiece collecting point unit; and
displaying the workpiece information on the display unit of the selected workpiece collecting point unit.

12. The flatbed machine tool of claim 11, wherein the signal device is adapted to display a placing signal as a function of a sorting signal for supporting an association of a removed workpiece by an operator to a subsequent processing step.

13. The flatbed machine tool of claim 12, wherein the subsequent processing step is placing a removed workpiece at the workpiece collecting point unit.

14. The flatbed machine tool of claim 11, further comprising a detection unit for imaging the sorting table with a plurality of workpieces arranged next to one another and for generating at least one first sorting image data set at a first point in time and a second sorting image data set at a second subsequent point in time.

* * * * *